(12) United States Patent
Hundley et al.

(10) Patent No.: US 12,116,957 B1
(45) Date of Patent: Oct. 15, 2024

(54) 3D-PRINTED ROCKET FUEL GRAINS, ROCKET ENGINES AND AN ADDITIVE MANUFACTURING PROCESS

(71) Applicant: X-Bow Launch Systems Inc., Albuquerque, NM (US)

(72) Inventors: Jason Hundley, Albuquerque, NM (US); Mark Kaufman, Auburn, CA (US); Michael McPherson, Socorro, NM (US); Jillian Marsh, Austin, TX (US); Matthew Hinton, Socorro, NM (US); Dane Fradenburg, Socorro, NM (US)

(73) Assignee: X-Bow Launch Systems Inc., Albuquerque, NM (US)

( * ) Notice: Subject to any disclaimer, the term of this patent is extended or adjusted under 35 U.S.C. 154(b) by 0 days.

(21) Appl. No.: 17/325,558

(22) Filed: May 20, 2021

Related U.S. Application Data

(60) Provisional application No. 63/049,056, filed on Jul. 7, 2020, provisional application No. 63/027,887, filed on May 20, 2020.

(51) Int. Cl.
| | |
|---|---|
| *F02K 9/10* | (2006.01) |
| *B64G 1/40* | (2006.01) |
| *F02K 9/18* | (2006.01) |
| *F02K 9/24* | (2006.01) |
| *F02K 9/28* | (2006.01) |

(Continued)

(52) U.S. Cl.
CPC ............... *F02K 9/10* (2013.01); *B64G 1/404* (2013.01); *F02K 9/18* (2013.01); *F02K 9/24* (2013.01); *F02K 9/28* (2013.01); *F02K 9/34* (2013.01); *F02K 9/72* (2013.01)

(58) Field of Classification Search
CPC ... B64G 1/404; F02K 9/10; F02K 9/18; F02K 9/24; F02K 9/28; F02K 9/72
See application file for complete search history.

(56) References Cited

U.S. PATENT DOCUMENTS

| | | | | |
|---|---|---|---|---|
| 3,214,906 A | * | 11/1965 | Coleal | F02K 9/72 |
| | | | | 60/257 |
| 8,659,422 B2 | * | 2/2014 | Tracy | B64G 1/403 |
| | | | | 340/3.1 |
| 10,023,505 B2 | * | 7/2018 | Danforth | F02K 9/08 |

(Continued)

OTHER PUBLICATIONS

Lyne, James Evans, The Use of a 3-D Printed, Polymer Matrix Containing, Pulverized Fuel in a Hybrid Rocket, Jul. 2018, AIAA Propulsion and Energy Forum (Year: 2018).*

*Primary Examiner* — Kyle Robert Thomas
(74) *Attorney, Agent, or Firm* — Temmerman Law Office; Mathew J. Temmerman

(57) ABSTRACT

A fuel grain for a rocket, the fuel grain having a plurality of layers of fuel grain material, each layer comprising a plurality of concentric circular structures of different diameter fused together to form a central opening therein, wherein the fuel grain material comprises an ignitable substance. The plurality of layers are stacked and joined securely to form a cylindrical fuel grain with the central opening of each one of the plurality of layers aligned to form a combustion unit extending axially through the fuel grain and bounded by a combustion surface, and wherein the fuel grain is configured to permit mixing of heterogenous materials to enhance thrust performance.

14 Claims, 1 Drawing Sheet

(51) Int. Cl.
  *F02K 9/34*   (2006.01)
  *F02K 9/72*   (2006.01)

(56) References Cited

U.S. PATENT DOCUMENTS

| 2013/0042596 | A1* | 2/2013 | Fuller | C06B 45/00 |
| | | | | 118/696 |
| 2018/0209381 | A1* | 7/2018 | Jones | B64G 1/403 |
| 2021/0062764 | A1* | 3/2021 | Gullo | F02K 9/96 |

* cited by examiner

3D-PRINTED ROCKET FUEL GRAINS, ROCKET ENGINES AND AN ADDITIVE MANUFACTURING PROCESS

RELATED APPLICATIONS

This application claims priority from the United States provisional application with Ser. No. 63/027,887, which was filed on May 20, 2020, and from the United States provisional application with Ser. No. 63/049,056, which was filed on Jul. 7, 2020. The disclosure of each provisional application is incorporated herein as if set out in full.

STATEMENT REGARDING FEDERALLY SPONSORED RESEARCH OF DEVELOPMENT

Portions of the invention described herein were made in the invention was made under a contract with an agency of the United States Government. The name of the U.S. Government agency and Government contract number are: US ARMY ACC-APG-RTP W911NF, Contract no. W911NF19C. The government may have certain rights in the inventions disclosed herein.

TECHNICAL FIELD

The present invention relates to automated fabrication systems, 3D-printable propulsion technologies, solid propellant materials, and methods of producing propellant elements. Specifically, the present invention relates to a method of production of a fuel grain for a solid rocket engine, a composite propellant fuel and oxidizer grain, and/or hybrid rocket engine having a fuel grain chamber and geometric shape that induces the flow of oxidizer as it passes through the fuel grain chamber.

BACKGROUND

The 3D-printed rocket engines and gas generators of fuel grain or hybrid designs described herein generally encompass propulsion technologies utilizing a pressurized oxidizer stored in a liquid or gaseous state, and a solid fuel. Prior art systems include both hybrid rocket engines (HRE), liquid rocket engines (LRE), and solid rocket engines (SRE). Reverse hybrid engines (RHE), where the oxidizer is stored in a solid state have also been described, but are much less common. The below background will focus on HREs due to their expanding relevance in addition to their many distinct advantages over purely liquid or solid systems, including overall simplicity, safety, improved operability, manufacturability, performance, and cost. In addition, the concepts described covering prior art HRE systems are broadly applicable, often encompassing SREs, LREs, RHEs, and other related systems.

Additionally, 3D-printed or additively manufactured solid rocket motors (SRM) can interchangeably use these techniques for construction of composite propellant motors, comprising a majority of SRM flight systems in use for commercial or government applications. These composite propellants can be distinguished from fuel grains or hybrid motors in that they contain a balance of both fuels and oxidizers in the composite mixture, whether blended into the composite slurry prior to introduction in the inert motor case or structure, whether fuel-rich in-process ingredients are added to case structures having oxidizer chemistries, or whether in-process oxidizer-rich ingredients are added to motor case structures having fuel characteristics, in each scenario resulting in a fuel and oxidizer composite SRM.

The advent of additive manufacturing technology has enabled new methods of designing and manufacturing rocket fuels with much more complex geometries. Using additive manufacturing, for example, hybrid fuel chambers can be designed and printed to include complex chamber geometries that were previously too difficult or impossible to achieve with traditional casting methods. Recent publications demonstrate the use of complex chambers geometries resulting in significant performance increases.

There are several types of additive manufacturing processes that can be used to manufacture fuels. A few common processes include Fused Deposition Modeling (FDM), Selective Laser Sintering (SLS), Stereolithography (SLA), and Laser Spray Modeling (LSM). Relatedly, a laser spray nozzle assembly is described in U.S. Pat. No. 4,724,299. This assembly includes a nozzle body, a housing, a cladding powder passage, and a cladding powder supply system that is operably associated with the passage such that the powder exits the opening coaxial with a laser beam. Notably, while FDM, SLS, SLA, and LSM processes represent some of the most common and most inexpensive forms of additive manufacturing, in many cases these processes provide for inferior material densities, limited scaling capabilities, poor repair capabilities, mechanical joint limitations, and/or machinability issues.

Prior art methods and processes are further known to produce excessive fabrication waste, require excessive labor, expend excessive energy and, in general, suffer from diminished production efficiencies. Prior art fabrication and manufacturing methods also typically alter the coefficient of thermal expansion, thereby introducing heterogeneity into thermal expansion rates, causing stress fractures, cracks and material fatigue such as bending or bowing. Further, there is a need for optimizing contact surface areas in order to maximize thermal energy transfer, reduce inert material requirements and thereby also reduce weight requirements. Finally, there is a need for 3D fabrication with capabilities of the highest thermal effectiveness, highest temperature allowances, highest pressure allowances, highest compactness, highest erosion resistance, and highest corrosion resistance.

Prior Art Fuel Chamber Designs

Recent studies have investigated a variety of performance enhancing geometries and have demonstrated significant increases in regression rates compared to simple straight chamber geometries. Each of said geometries utilize a different technique to manipulate the oxidizer flow. A first prior art example, conducted in 2014 at Pennsylvania State University (PSU), concerns a composite fuel system utilizing a printed acrylonitrile butadiene styrene (ABS) tabulator structure cast with paraffin (See, Armold et. al., *Formulation and characterization of paraffin-based solid fuels containing swirl inducing grain geometry and or energetic additives,* 2014). Regression rates for the turbulator were measured using conventional methods. In this case, the added turbulator was shown to increase regression rates by an average of 35%, although a small sample size of testing was performed.

In a related publication, star swirl fuel chamber designs using an acrylic fuel and gaseous oxygen were employed, achieving regression rates of an average of 250% greater over the standard cylindrical straight chamber design (Id.). This effect was seen to increase with each turn per inch for each swirl design tested.

Additional star swirl chambers are known in the art that utilize ABS and N2O. The related publications describe notable increases in regression rates over straight chambers for similar oxidizer mass fluxes. Further, these publications demonstrate a potential regression rate increase of up to 67% for the star swirl over straight chamber designs (See, B. R. Mcknight et al., *Advanced hybrid rocket motor propulsion unit for CubeSats*, 2015). However, this study was also shown to slightly decrease the combustion efficiency by as much as 15% for some tests.

Relatedly, in 2012 Utah State University (USU) conducted a study investigating the performance of a helical swirl design (See, A. Bath et. al., Performance characterization of complex fuel chamber geometries for hybrid rocket fuel grains, 2012). The motivation was to enable larger fuel surface burning area without increasing the length of the fuel grain. The helical fuels were printed in ABS and the oxidizer was N2O. The helical swirl design increased regression rates by up to 130% when compared with straight chamber fuels at the same oxidizer flux. For post burn regression analysis, USU first sectioned the fuel, then the cross sections were imaged to recreate a computerized mesh of the burned grain. The average radius was then calculated to obtain the average regression rate for the burn.

Conventional cast manufactured hybrids have made use of performance enhancing additives in their formulations. These additives can increase regression rates through enhanced radiation, enhanced heat transfer, as well as increased density. One prior art system has shown that the regression rate of HTPB with GOX oxidizer can be increased by the inclusion of 5% (by weight) 100 nm sized aluminum particles (See, J. C. Thomas et. al., Hybrid rocket enhancement by micro- and nano-scale additives in HTPB fuel grain, 2015).

This effort was led by the Jet Propulsion Laboratory in collaboration with the Aerospace Corporation and Texas A&M University. In particular, Thomas et. al. notes that particle size is a key factor in performance enhancement. Micron sized particles increase regression rates by enhancing the radiation heat flux from the combustion flame to the fuel surface. Nano-scale aluminum particles additionally have lower ignition temperatures and higher specific area, releasing energy closer to the surface.

Relatedly, Hassan et. al. showed that the use of Lithium aluminum hydride (LiAlH4, LAH) and Magnesium hydride (MgH2, MGH) nanoparticles significantly increased the regression rate of a paraffin-based fuel used with a gaseous oxygen oxidizer (See, A. Hassan, *Characterization of paraffin-based hybrid rocket fuels loaded with nanoadditives*, 2018). Further, Leoni and Vadala showed an increase in performance using a mixture comprised of pure HTPB with a 10% Al—Cu powder composition (See, P. Leoni and G. Vadala, *Innovative metallized nano-sized additives for hybrid rocket propulsion*, 2012). This publication demonstrated an increase in regression rate of up to 37% compared to the standard HTPB fuel.

Prior Art Fuel Grain Structures

Additive manufacturing of hybrid fuels has also enabled the design of hollow grain structures which can then be filled with another fuel. The printed structure can be designed as a matrix that releases pockets of the supplemental fuel. The secondary, tertiary, and quaternary fuels may have increased performance properties and their use is enabled by the printed grain structure. In addition, thrust profiles can be improved by custom tailoring fuel formulations such that the fuels burn through various sections of varying energy densities.

Lyne et. al. showed that a printed grain matrix structure may be filled with powdered fuels such as coal, graphite and/or aluminum (See, J. E. Lyne, *The use of a 3-D printed, polymer matrix containing pulverized fuel in a hybrid rocket*, 2018). The completed fuel may be roughly 50% ABS and 50% powdered fuel by volume. Voids may be optimized to achieve maximum powdered fuel mass while ensuring the ABS structure does not prematurely collapse. This publication described meaningful increases in thrust levels in addition to novel 3D-printable components. Relatedly, The Aerospace Corporation described a related technique which utilizes a printed grain structure that releases liquid fuel rather than powdered fuel (See, *Aerospace annual rechamber: Creating an agile space enterprise*, 2018). This technique has been stated to potentially increase regression rates by up to 100%.

Additional techniques for achieving performance increases have also been explored. These include using a swirl injector and mixing additives injected into the cast fuel. Some work has also been done exploring the effect of compounding these techniques along with complex fuel chambers. In some cases, this has led to additional performance increases in regression rates. For example, the turbulator grain design can be combined with a paraffin/aluminum fill mixture, in addition to a swirl oxidizer injector, in order to increase regression rates.

Prior Art Composite Propellant SRM Designs and Applications

In Danforth et. al (U.S. Pat. No. 10,093,592) fuel material is interspersed with oxidizer material and may be made by additive manufacturing processes such as 3D printing, by use in examples with different extruders, specified for fuel or oxidizer as filaments from the respective extruders. The fuel or oxidizer extrusions may be separately modified to control desired characteristics of burning rates as an example, or their locations controlled to create a fuel and oxidizer pair in a 'combustible element' as fundamental to the claims presented therein.

Lynch et. al (U.S. Pat. No. 10,337,457) demonstrates layered energetic grains alternating with powder energetic material in a solid rocket motor. These discrete powder and solid-phase energetics layers are selected for their combustion rates to provide certain efficiencies of thrust or mechanical properties, tailored for end-use or mission. Also disclosed is use of 3D or additive manufacturing methods for inert constructs or energetic slurries. Slurries in this case are comprised of a liquid heated thermoplastic composition that when extruded through heated nozzles subsequently cools to a solid having preferred geometries. The second of two disclosures involve the deposition of powder energetic material followed by a heated thermoplastic composition or 'bonding agent', effectively providing layers of powders affixed with solid thermoplastic adhesive, in a buildup of layers providing preferred designs of SRM thrust vs time.

Summers et. al in U.S. Pat. No. 10,287,218 discusses additively manufactured propellant elements manufactured via extrusion of partially cured mixtures, emplaced using 3D techniques, and subsequently cured to preferred physical states allowing a SRM build process to ensue. It instructs on use of resonant acoustic mixers as an example, providing slurries of fuel and oxidizer in a binder, according to known principles. Following mix of these, a curative may be introduced, with the timing of cure to allow the partial state of properties suitable for deposition through a heated nozzle or extruder providing initiation of a more complete state of cure as it is deposited in a near-final form.

Prior Art 3D Printing And Testing Capabilities

Additive manufacturing, or 3D printing, refers to a variety of different processes. The most common method of additive manufacturing for printing complex fuel chambers in recent studies has been fused deposition modeling (FDM). In the FDM process, the fuel is printed layer by layer. In the FDM process, a roll of polymeric filament is continuously fed through a hot end, which melts the material and bonds the material to the previous layer. Once a layer is completed, the extruder raises to complete the next layer. This process repeats for each layer until the final layer is completed.

Advantages of FDM include low cost, ease of use and the availability of open source hardware and software. Ideal FDM printers are capable of printing very fine structures, for example, ABS fuel filaments. ABS has a high print temperature of 240 degrees Celsius, and requires a controlled thermal environment to prevent warping. In addition, heated beds are necessary to ensure that the ABS will adhere to the build plate, and maintain sufficient temperature to prevent premature cooling and warping.

In one example, the MakerBot 3D printer from Johnson and Johnson 3D Printing Laboratory may be used, but it does not contain heated beds and is limited to printing PLA filament. Therefore, a dedicated 3D printer for producing ABS fuels is often preferable. For example, a Creality Ender 3 with a glass heated bed is known in the art to print the ABS fuels and ABS-type fuels with high efficiency.

Indeed, in recent years additive manufacturing (AM) has been implemented in the printing of rocket components using the above components, and the like. AM has enabled design of fuel grains with complex chamber geometries which are not possible or very difficult to achieve through conventional casting techniques. These geometries can be used to manipulate the oxidizer flow and interactions with the fuel to increase performance of the engine. Indeed, some recent studies using a variety of performance enhancing geometries have shown significant regression rate increases. Prior art examples include but are not limited to hot-fire experiments of printed fuels in addition to additive manufacturing techniques for ABS+Aluminum complex chamber fuels grain, the later resulting in successful tests for a 3D printed ABS+Aluminum hybrid rocket fuel grain.

Although recent developments in additive manufacturing are promising, as described above there are many geometries and configurations that remain unexplored. Performance enhancing mechanisms are largely unknown or under development, and much exploration will be required to perfect fuel grain designs, demonstrate reliability, and explore potential new geometries.

For the foregoing reasons there is a need for additively printed complex rocket and gas generator components. As discussed, there is a need for custom tailored fuel chambers and fuel formulations such that when a solid rocket engine burns through its fuel, it burns through various sections of the fuel, which might be of varying energy densities. For the above reasons, there is also a broad need in the art for small gas generators and small diameter rockets (for example, up to 5 inch-60 inch diameter rockets) that are produced in an increasingly efficient and environmentally friendly manner.

SUMMARY

The present invention may be used as a rocket motor, system for generating combustion gases, a system for propelling a munition, and the like. This system may be used to propel numerous objects, including but not limited to projectiles, missiles, bombs, supply containers, small satellites, and research stations. Notably, the present invention provides many advantages, including the ability to construct a device with multiple components in a single integrated manufacturing process that is continuously monitored. Furthermore, a wide variety of propellant viscosities and fuel grain geometries are contemplated relative to conventional systems. Importantly, the present invention permits a user to extrude both electrodes and propellants together in a single continuously monitored, continuously modifiable additive process.

In summary, the present invention comprises a solid and/or hybrid rocket using a fuel grain that comprises a plurality of layers of fuel grain material, each layer including a plurality of concentric structures of different diameter fused together to form a central opening therein. As described above, the fuel grain material may comprise an ignitable substance. Further, the plurality of layers are stacked and joined securely to form a cylindrical fuel grain with the central opening of each one of the plurality of layers aligned to form a combustion unit extending axially through the fuel grain and bounded by a combustion surface. In some embodiments, the combustion unit comprises a circular shape, an oval shape, an elliptical shape, a cylindrical shape, a polygonal shape, or an irregular shape. Notably, the above-discussed central chamber is formed at least in part by said plurality of layers.

Further, the fuel grain is configured to permit mixing of heterogenous materials to enhance thrust performance. In some embodiments, mixing of heterogenous materials comprises continuous mixing via a robotic continuous mixer. Further, heterogenous materials may comprise unfilled thermoplastics and/or filled thermoplastics with natural fibers, carbon fibers, minerals, metal particles, and heterogenous propellants. In some embodiments, the fuel grain has tailorable chemistries adaptable to continuous monitoring and/or continuous modification during the additive manufacturing process. In other embodiments, the fuel grain further comprises a thermally insulating material surrounding the fuel grain. Further, the present invention includes an oxidizer source. The oxidizer source is for flowing through the combustion port during engine operation. In some embodiments, one or more nozzles are in fluid communication with the combustion port. In addition, a shell is utilized for housing at least the fuel grain and the oxidizer source.

Furthermore, a method of making a fuel grain for use in a rocket engine is contemplated. Said method permits continuous monitoring, continuous mixing, and continuous modification of the slurry layers by way of one or multiple nozzles. In some embodiments, the method of making a fuel grain includes compounding a first material suitable as a hybrid rocket propellant, a second energetic material, and a third ignitable material according to a predetermined mixture ratio in order to form a fourth material. Notably, in some embodiments this fourth material may serve as a raw material for use in an additive manufacturing device. In other embodiments, this proprietary method involves operating the additive manufacturing device using the above-mentioned raw material to fabricate a solidified fuel grain comprising a plurality of stacked layers.

This invention includes the manufacturing method of a SRM comprised of composite propellant formulations, described as double base propellants and their like, thermoset and thermoplastic composite propellants, nitrate-ester polyether (or NEPE) formulations as examples, uniquely providing constructs via the 3D additive manufacturing process. The continuous extrusion of propellants according to robotic and automated processes extends from the mix of heterogeneous materials (solid and liquid) having optimized characteristics of SRM performance, when deposited in preferred designs for a tailored thrust vs time profile of the finished item. Embodiments extend to the control of ballistics/burning rates via mixture control of ingredients, control of mechanical properties via various cure chemistries of binder/solids interactions with curatives, control of SRM internal designs having baffles, fins, or other structures with inert or energetic properties, these via the use of print techniques coupled with dynamic formulation slurry viscosity and cure rate control, in a continuous process.

It is a first objective of the present invention to produce an efficient and affordable means of propelling various projectiles including missiles, projectiles, small satellites, and the like.

It is another objective of the invention to provide a sustainable means of producing a 3D-printable fuel grain capable of embedding a variety of materials such as propellants.

It is another objective of the invention to improve storage conditions, and to provide a means for continuously monitoring additive processing steps.

It is another objective of the invention to enable embedded sensors to be integrated into said fuel grains, and to provide a means for continuous modification during additive processing.

These and other advantages and features of the present invention are described with specificity so as to make the present invention understandable to one of ordinary skill in the art.

DETAILED DESCRIPTION OF THE INVENTION

The present invention is directed towards solid and hybrid-fueled rocket motors, solid fuel grains 100, composite propellant grains, and methods of production for a rocket engine. In some embodiments additive manufacturing is utilized to construct a novel solid and/or hybrid rocket propellant grain structure. The present invention also comprises methods for using said grains in the operation of a composite solid propellant rocket motor, hybrid and/or solid-fueled with gaseous or liquid oxidizer rocket engine. Notably, these processes are distinct from generalized spraying, wherein insulation is sprayed directly onto rockets. In additional embodiments, additive manufacturing may be utilized to embed an ignition structure or formulation characteristic in order to enhance flame spreading upon ignition on the propellant surface within the rocket motor.

Regarding fuel grains 100, in some embodiments a solid fuel grain may be manufactured by various means including a deposition type additive manufacturing apparatus. In the preferred embodiment, the disclosed method of production includes a building platform capable of moving in XYZ directions, controlled by step motors. Said step motors are used to modulate the three-dimensional construction of the rocket engine, the rate of fuel grain deposition, and other factors.

Further to the above, the present system is used for printing or otherwise additively manufacturing a solid rocket motor and related rocket motors incorporating solid rocket motor components. As described above, the device is additively manufactured layer by layer on a platform or bed and, in the preferred embodiment, benefits from continuous modification or monitoring. The device includes a propellant or gas-producing energetic material or propellant material processed via continuous modification, electrodes that are operatively coupled to the energetic material, and a shell 104 encapsulating the energetic material, electrodes, and the like.

Figure 1A:
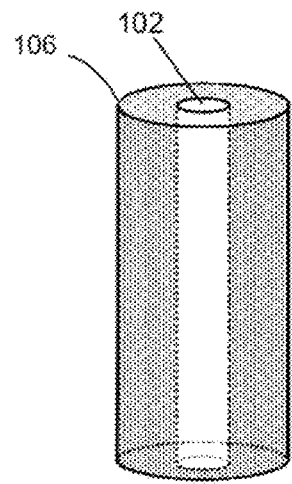
FIG. 1A depicts a fuel grain section with a generally cylindrical shape including a center chamber according to an embodiment of the invention.
Figure 2A:
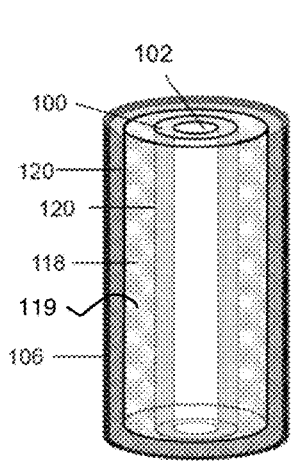
FIG. 2A depicts a detailed fuel grain section with a generally cylindrical shape including the shell, center chamber, and annular sections and other elements according to an embodiment of the invention.

Additional details of fuel grains, including their fabrication, are described and claimed below. Preferably, as shown in FIG. 1A and FIG. 2A, the fuel grain section has a generally cylindrical shape and defines a center chamber 102. In the preferred embodiment, the center chamber 102 has a substantially circular cross-section, but the center chamber 102 may have other geometries such as a star or polygon, without departing from the scope of the present invention.

In the preferred embodiment, the herein contemplated invention comprises nozzles 103, said nozzles 103 generally contained within a print head(s). Multiple print heads are contemplated, one to tailor the inert composition and the other to be focused on the energetic itself. The nozzles 103 are used for extruding or otherwise depositing material for the components of the device. Raw materials for the components may be stored in reservoirs that are operatively coupled to supply materials to the respective nozzles 103. Notably, in some embodiments, the nozzles 103 and print heads are adapted to extrude high viscosity slurries.

In some embodiments, the nozzles 103 may have different configurations, and may require different treatments of their respective materials. Further, the print heads are adaptable for use with various nozzle diameters and/or nozzle flow feed mechanisms (such as different rates of feeding raw material) in order to extrude different materials layer by layer. In other embodiments, the present invention is configured to handle materials of heterogenous viscosity. Further, processing speeds are modifiable on-demand and the present invention is generally adapted for use with a wide range of operable speeds. Further, the nozzles 103 may handle a wide range of material volume, and/or may deposit materials of very high-viscosity relative to conventional systems.

In some embodiments, the nozzles 103 may move together as a single unit with the print head. Further, supply of material to one or more of the nozzles 103 at various locations may be used to deposit the distinct materials precisely where each material is needed. Alternatively, one or more of the nozzles 103 may be moved separately from the others. In another embodiment, one nozzle 103 successively translocates in space to deposit different types of material in rapid succession, in order to successively build up a single heterogenous layer. In summary, the above processes may be characterized by continuous variation over time through one or multiple nozzles 103.

To aid in controlling the content of water and/or glycerol (or other solvent) in the extruded material, the energetic material nozzle may be heated to a higher temperature than that in the general environment of the center chamber 102. In some embodiments, the nozzle 103 may be heated to a temperature that is at least that of the boiling point of the solvent (such as glycerol and/or water) that is in the baseline propellant material, but is below a temperature at which the baseline propellant material decomposes. The decomposition may involve a heat-producing chemical reaction. This allows for removal of solvent material while still preserving the capability of the extruded material to function as a propellant (to later undergo the chemical reaction between the fuel and the oxidizer that produces propellant products such as pressurized gases). In addition, in some embodiments chemical reaction of the fuel and the oxidizer during the manufacturing process is undesirable in that it produces heat and combustion products, which can damage the manufacturing system. In some embodiments the nozzle 103 comprises an energetic material nozzle that may be heated by any of a variety of suitable mechanisms, many of which may be integrated into printer heads. For instance, the nozzle 103 may be electrically heated, with the electrical heating controlled by a suitable a feedback mechanism that controls the temperature of the nozzle.

Notably, in some embodiments the temperature of mixing may be directly proportional to the viscosity of the baseline materials (also referred to herein as "slurry") and the thermal stability of the components used in the mixing system. The viscosity of the slurry determines the shear stress generated during compounding, which in turn determines how well various agglomerates are broken down, how well the slurry is degassed or deaerated, and how well the individual particles are dispersed. Thus, in some embodiments it is advisable to use higher temperatures for slurries with a higher viscosity and lower temperatures for slurries with a low viscosity.

In some embodiments, the present system is capable of printing with at least four to ten different materials. Further, the present system is capable of mixing heterogenous materials (i.e., various slurries and/or propellants) during the printing process. Said heterogenous materials may include unfilled thermoplastics and filled thermoplastics with natural fibers, carbon fibers, minerals, and/or metal particles. In some embodiments, continuous mixing via a robotic continuous mixer and continuous extrusion of a given material is contemplated. For example, in one embodiment a slurry material, or the like, may be continuously extruded into a given shape with a mandrel, effectively hybridizing the herein disclosed novel additive manufacturing technique with a more traditional "mix and pour-type" technique. This is permitted by use of a continuous mixer robot, various other robotics, and in-process continuous monitoring.

As described above, in some embodiments additive manufacturing of solid and/or hybrid rocket motors is accomplished using one or more print heads to deliver both inert and energetic materials. Notably, in some embodiments gas may become trapped in various voids during construction. As a consequence, one may utilize an inert shielding gas in order to enhance combustion. For example, carbon dioxide will contribute oxygen to the combustion reaction whereas argon, an inert noble gas, will not. Further to the above, in some embodiments a heavier-than-air inert or non-nanocomposite aluminum reactive gas may be utilized to cover a print bed and a nozzle of the additive manufacturing apparatus. In yet another embodiment, a 3D printer may be configured such that the print bed is fully enclosed and sealed, and an inert non-heavier-than-air gas, such as nitrogen, infills the print bed chamber.

In some embodiments, continuous monitoring of the additive process is contemplated. Continuous monitoring may concern any step of the additive process, including the steps of post-cure inspection (i.e., x-ray), clean-up, and/or trimming steps. In some embodiments, the printing process is monitored by a logical controller, and a computer is used as an interface to enter the monitoring conditions (i.e., temperature, screw rotational speed, and material rate of deposition). In still other embodiments, monitoring and modification of the following are possible: fuel/oxidizer ratios, solids/binder ratios, mechanical properties, and/or thermoplastic/thermoset curable formulations. In yet another embodiment, the use of formulations including thermoplastic and passivated nanoscale metallic material permits continuous monitoring and modification during printing.

In one embodiment, continuous monitoring addresses the issue of maintaining the filament's diameter and roundness. Notably, a given filament's diameter and roundness often needs to be monitored with laser micrometers or other optical sensors so that the different processing parameters may be adjusted. In order to produce filaments with constant dimensions and roundness, a nozzle may be coupled with a conveyor belt that pulls away the filament, which is eventually spooled in a winding unit. Depending on the thermal conductivity of the filament, it may be necessary to cool down the filament by water or by air. Most highly-filled filaments have a high enough thermal conductivity that no water cooling is necessary. As a result, continuous monitoring may be utilized to monitor and modify all of such parameters in real-time. Such parameters may also include, for example, the extruder temperatures and rotational speed, the speed of the conveyor belt, and/or the spooling device.

As described above, the disclosed method of production includes a building platform capable of moving in XYZ directions, controlled by step motors in order to modulate various factors, and further may permit a continuous horizontal printing pattern. By printing in a continuous printing pattern, the fuel grain production system can continuously print, thus reducing the total printing time. Notably, printing includes applying successive fuel layers continuously for a predefined distance in the direction primarily parallel to the central axis 115.

In some embodiments, once the model is created and oriented, a preprocessing system then preferably divides the oriented fuel grain model into two-dimensional layers with defined footprint areas that increase with each subsequent two-dimensional layer until a width of the fuel grain model is achieved. The fuel grain production system receives the fuel grain model that is oriented in a direction of the central axis 115 and already divided into two-dimensional layers. The system then prints the fuel grain by applying at least one fuel layer in a direction primarily parallel to the central axis 115. Printing may include applying successive fuel layers continuously for a predefined distance in the direction primarily parallel to the central core axis 115. For example, printing may be accomplished by printing a first layer of the fuel grain in a continuous path filling the determined footprint area of the layer with propellant material and then printing successive layers in a similar manner.

In the preferred embodiment, the herein disclosed rocket utilizes a fuel grain that comprises a plurality of layers of fuel grain material, each layer including a plurality of concentric circular structures of different diameter fused together to form a central opening therein. Notably, in the preferred embodiment the fuel grain material comprises an ignitable substance. In other embodiments, the plurality of layers are stacked and joined securely to form a cylindrical fuel grain with the central opening of each one of the plurality of layers aligned to form a combustion unit extending axially through the fuel grain and bounded by a combustion surface. In some embodiments, the combustion unit comprises a circular shape, an oval shape, an elliptical shape, a cylindrical shape, a polygonal shape, or an irregular shape. Notably, the above-discussed central chamber is formed at least in part by said plurality of layers.

In some embodiments, the fuel grain is configured to permit mixing of heterogenous materials to enhance thrust performance. In some embodiments, heterogenous materials comprise unfilled thermoplastics and/or filled thermoplastics, the unfilled thermoplastics and/or filled thermoplastics being filled with natural fibers, carbon fibers, minerals, and/or metal particles. Further, it is notable that heterogenous materials may comprise unfilled thermoplastics and/or filled thermoplastics with natural fibers, carbon fibers, minerals, metal particles, energetic solid particles, and heterogenous propellants. In some embodiments, the fuel grain has tailorable chemistries adaptable to continuous monitoring and/or continuous modification during the additive manufacturing process. In other embodiments, the fuel grain further comprises a thermally insulating material surrounding the fuel grain.

Figure 1B:
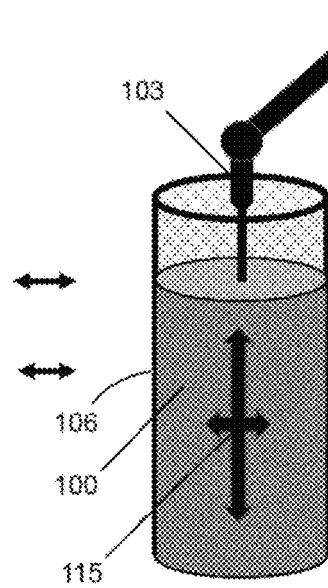
FIG. 1B depicts a fuel grain section with a generally cylindrical shape including a center chamber, nozzle and central axis according to an embodiment of the invention.
Figure 1C:
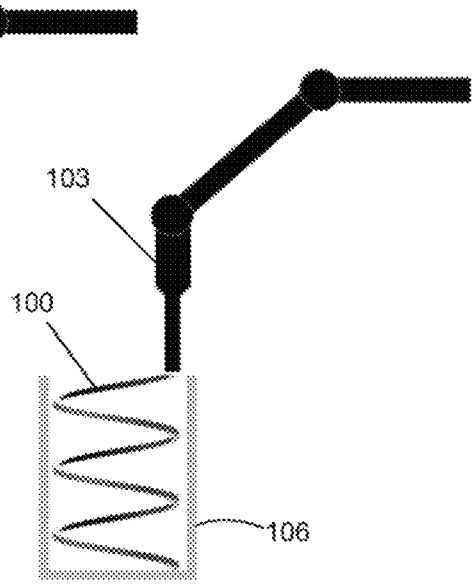
FIG. 1C depicts a fuel grain section with a generally cylindrical shape including a center chamber, nozzle, and helical deposition pattern according to an embodiment of the invention.

Regarding the printing process, the melted materials flow through the respective nozzles 103 per FIG. 1B and FIG. 1C. These nozzles 103 then extrude the melted materials along a primary axis 115 in a linear pattern. Continuous printing in such a pattern is not required, but does increase the speed of production. The specific pattern of printing allows for a continuous layer of material to be printed without stopping the print head thereby reducing printing time.

Figure 2B:
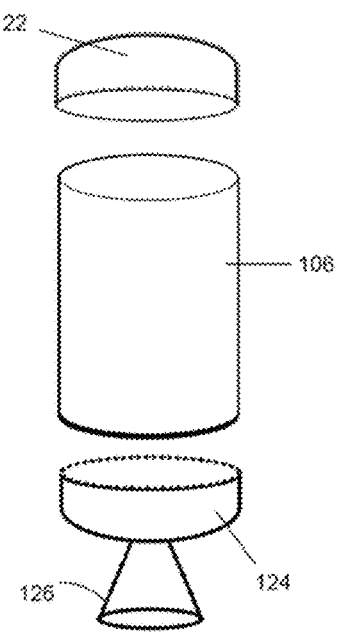
FIG. 2B depicts an exploded view of generally cylindrical rocket shape including a shell, a pre-ignition section, a post-ignition section, and a payload section.

FIG. 2A and FIG. 2B show an exemplary rocket engine incorporating the fuel grain 100 as described above. As depicted in FIG. 2B, the exemplary rocket includes a payload section 122 at one distal end of the rocket body, the body comprising a cylindrical shell 106 housing a series of annular sections 120. FIG. 2A depicts said annular sections 120 which, in one embodiment of the invention, may be embedded with electrodes and various sensors. For illustration purposes there are spaces 118 between the annular sections 120, but in an actual device said spaces 118 may be filled with an electrically-operated Propellant 119 or energetic gas-generating material. As depicted in FIG. 2B, the exemplary rocket also includes a pre-ignition section 124 and a post-ignition section 126 at the end of the rocket body opposing the payload section 122.

In some embodiments, continuous modification is directed to modification of fuel/ox ratios, solids content, mechanical properties, and the like. In addition, in some embodiments a retardant layer may act to modify burning of an ignition channel. Further, in some embodiments a retardant layer may partially or completely inhibit burning of an ignition channel wall and/or reduce the rate of burning of an ignition channel wall.

In some embodiments, a first propellant has a slower burn rate than a second or third propellant. In other embodiments, the propellant material may be any of a variety of materials that burn to produce pressurized gases, and that is ignited by using the electrodes in the preferred embodiment. One class of propellant materials are materials that produce an electrically-activated (or electrically operated) solid propellant. As is known in the art, a solid propellant may include an oxidizer, a fuel, and a binder in some iterations. In some embodiments, the oxidizer may be a solid-based perchlorate oxidizer that includes ammonium perchlorate, aluminum perchlorate, barium perchlorate, calcium perchlorate, lithium perchlorate, magnesium perchlorate, perchlorate acid, strontium perchlorate, and/or sodium perchlorate. Similar examples of non-perchlorate solid oxidizers may include ammonium dinitramide or other salts of dinitramidic acid, nitrate salts such as ammonium nitrate. The fuel may be a metal-based or non-metal-based fuel. Metal-based or semi-metal fuels may include, for example, boron, tungsten, magnesium, lithium, copper oxides, copper, titanium, and/or aluminum. The binder may include casein, methyl cellulose, polyethylene oxide, polyvinyl acetate, and/or polyvinyl alcohol.

It should be noted that solid-fueled rocket motors in some cases possess characteristics which render them preferable to liquid-fueled engines, especially for military applications. For example, solid-fueled rocket engines do not require a complicated systems of valves, pumps, and tubing to move the propellant constituents from their storage tanks to the combustion chamber. Moreover, there is no requirement for the storage, transportation, and handling of great quantities of highly corrosive, toxic, and easily vaporized materials as with many liquid-fueled engines.

However, liquid-fueled engines have some important advantages over the solid-fueled engines. In a solid propellant fuel grain 100, the fuel particles and oxidizer source 101 are bound together as a single unit. Once the grain has been ignited, combustion continues until the entire grain is consumed. This makes it difficult to vary the total impulse of the rocket motor. Such devices as head-in reversal ports have not proven completely satisfactory in alleviating this problem. On the other hand, the flow of liquid propellant to the combustion chamber can be readily controlled by valves, variable pump speeds, and the like so that the overall total impulse of the engine can be varied. The flow of propellant can even be completely stopped and then restarted if desired. This characteristic of liquid-fueled engines permits propelling missiles varying distances. Thus, it is readily apparent that it would be very desirable to have a hybrid or solid-fueled rocket motor, such as that disclosed herein, that would permit a wider variation in total impulse, thus combining the advantages of both solid-fueled and liquid-fueled engine.

In some embodiments, a hybrid rocket engine ("engine" also referred to herein as "motor") permits unique operational advantages. As described herein, in some embodiments an oxidizer is introduced into the solid fuel grain 100 section along a pathway defined by a center chamber 102. Although, in the preferred embodiment, a fuel grain section may be manufactured in various sizes or dimensions, in an exemplary embodiment, the fuel grain section has an outer diameter of at least 6 inches. Although a fuel grain with any grain diameter can be fabricated, in some embodiments a ratio of about 5:1 (outer diameter to inner diameter) may be used for a hybrid rocket fuel grain.

In the preferred embodiment, the rocket engine further comprise an oxidizer source. As described above, the oxidizer source is for flowing through the combustion port during engine operation. As described above, a shell is further utilized for housing at least the fuel grain and the oxidizer source. Notably, the fuel grain composition is described in detail above, include details pertaining to its geometry, construction and its pyrophoric nature.

In some embodiments, the device may include an electrically-controlled (also referred to herein as "electrically-operated") propellant and/or a comparable energetic material. Said propellant may be additively manufactured in conjunction with said electrodes and/or sensors for producing a reaction in the material and/or for providing continuous monitoring and modification capabilities. The device may also include a shell 106 that is additively manufactured with the other components. The additive manufacturing may be accomplished by extruding or otherwise depositing raw materials for the different components where desired. The electrodes may be made of a conductive polymer material, for example using an electrically-conductive fill in a polymer. As described above, FIG. 2A shows annular sections 120 which may be embedded with said pair of electrodes 130 and other sensors. The spaces 118 between annular sections may be filled with an electrically-operated propellant in some embodiments.

In some embodiments, each structural layer may be formed by deposition of viscous polymers, forming a plurality of solidified adjoining structural spheres of material. In some embodiments, the viscosity of said viscous polymers are optimized and controlled such that operational yield stress is enhanced relative to prior art systems. As for the adjoining sphere structures, the objective is to increase the surface area presented to the flame zone for combustion (in some embodiments, within the center chamber 102) in a manner that is persistent throughout the hybrid rocket engine operation. In this exemplary embodiment, the surface pattern presented to the flame zone is characterized by a series of projections and depressions. According to other embodiments, the surface pattern may comprise a plurality of ribs, divots, knobs and/or recesses.

As described above, the viscosity of said viscous propellants and polymers are optimized and controlled such that operational yield stress is improved in a given system. Notably, the present invention is compatible with highly viscous materials, and is adaptable to perform across a wide range of viscosities. In the preferred embodiment, the present invention contemplates processing with viscosities that are higher than those described in prior art systems. This results in a substantial advantage relative to standard solid rocket preparation in that high viscosity propellants are now easily adaptable to be cast by the batch method, and other comparable methods. As described above, this advantage is largely related to grain size, but also to the unique processing features described above. In some embodiments, rocket motors are capable of being printed in their final high viscosity form (without substantial variance in viscosity throughout the curing process).

In one exemplary embodiment, each fused stacked layer is formed from a series of fused concentric circular spheres of solidified material featuring a pattern designed to increase the surface area of the combustion surface, as compared to a smooth construction. In one embodiment the center chamber 102 features unique patterns designed to induce oxidizer vortex flow persisting throughout the rocket engine's operation as the fuel is consumed. Notably, various surface features that create a heterogenous and/or elevated surface and increase the surface area of the center chamber 102 are contemplated by the present invention.

In some embodiments, the oxidizer may be eutectic mixtures or emulsions, or an aqueous solution with the oxidizer material dissolved in water and/or glycerol. It has been found that controlling the amount of water and/or glycerol in the extruded material in an on-demand fashion facilitates additive manufacture of the propellant material. Too much solvent in the printed mixture can cause problems with curing the extruded material and having the extruded material properly maintain its shape. Too little solvent can result in problems with the material adhering to other material layers.

The raw propellant material that is used to additively manufacture the propellant material may have any of a variety of other suitable formulations. Broadly, the raw propellant material may include a fuel, a solvent (e.g., water and/or glycerol), an oxidizer, and a binder. The fuel and the oxidizer are the chemically-active components that react with one another to produce the pressurized gases. The solvent receives the fuel and other components to allow mixing together of the components into a flowable material. The binder aids in maintaining the raw material as a unified material that can be cured and/or dried into a solid mass. Further to the above, regarding the oxidizer source, a liquid or gaseous oxidizer may be utilized. As described above, the oxidizer is for flowing through the combustion port during engine operation. However, in one embodiment of the present system, liquid or gaseous oxidizer may be stored adjacent to the motor section or even remotely on the vehicle. Regardless of the configuration or type of liquid or gaseous oxidizer used, the assembly of oxidizer tank, pressurizing system and associated plumbing is typically referred to as the oxidizer port. In some embodiments, the motor port and the oxidizer port are referred to collectively as a hybrid rocket engine system, sometimes also referred to as a hybrid rocket motor.

In some embodiments, the invention contemplates a rigid or solid cast type form and in which the charge includes an encapsulated propellant sphere of liquid propellant in heterogenous distribution throughout a rigid matrix forming the solid charge. In addition, the invention may include the propellant charge as a combustible material having separate propellant spheres of fluid of different material disposed in a heterogenous distribution throughout a rigid matrix wherein each propellant sphere is separately encapsulated in a casing which is not reactive with the fluid and with the matrix at ambient conditions.

In some embodiments, the geometries of the fuel grain can be varied to achieve a desired thrust profile, in addition to (or alternatively) changing the porosity. In some embodiments, as shown in FIG. 2A, the center chamber 102 geometry directly relates to the intermediate wall structure and the fuel grain. These geometries generate a particular thrust profile that may be dictated by mission parameters or other performance specifications of the engine. Relatedly, in some embodiments, a variety of thrust profiles are generated which correspond to a given fuel grain geometry. It may be desirable to employ different thrust profiles in order to account for different mission parameters, such as burn duration, desired impulse, g-force sensitivity of onboard electronics or life-forms, or timing issues that demand different thrust at different times.

Variation in fuel transmission, created by variations in the size, distribution, and type of constituent passages, allow for the distribution of fuel throughout the center chamber 102, for example, in accordance with the expected fuel regression rate. Similarly, variation in pore size and fuel transmission enables the creation of fuel grain shapes, similar to those of traditional solid motors. Regression, or the amount of fuel consumed over a given amount of time at a given location along the inside of the center chamber 102, is related to the initial shape of the center chamber 102, the initial shape and distribution of fuel throughout the center chamber 102, the flow of fuel that is injected during the firing of the engine, and the chemical nature of the fuel(s) and oxidizer(s) used.

In some embodiments, a matrix of different geometries is utilized such that fuel grain motors are modified via a continuous variation capacity, independent of size. Further, as discussed above, the chemical nature of the fuels and oxidizers are of critical importance. The herein described invention contemplates related tailorable chemistries for such fuels and oxidizers. Notably, the present invention contemplates the entire range of the explosive process vs. the inert process. Finally, the printed in situ capabilities described above are such that the final product motor has customizable embedded sensors.

In some embodiments, the herein described invention may be adapted to wide variations in internal ballistics. In some embodiments, modelling may neglect or approximate processes of secondary importance such as flame propagation through various channel voids. Accordingly, the present disclosure provides different propellant grain configurations for achieving different desired performance characteristics.

In other embodiments, as described above, additive manufacturing is utilized to embed isolated formulations or structures in the propellant. Further, additive manufacturing is utilized to enhance combustion efficiencies or ballistics in a given system. In other embodiments, additive manufacturing is utilized to create motor designs on demand, without the use of molds or templated tooling elements.

In some embodiments, when used in military applications, additive manufacturing may be utilized to co-express propellant, explosives compositions, or the like, in order to enhance warhead effectiveness. In some embodiments, a room-temperature cure procedure is utilized wherein energetic formulations are cured at room temperature, thereby resulting in a stress-free motor interface across all anticipated propellant/insulation interfaces. Further, alternate design features are contemplated wherein a variety of room temperatures are utilized. The above uses of additive manufacturing also generally benefit from minimized nucleation and minimized fissure creation during storage and/or operation. As a consequence, a reduced incidence of catastrophic failure is experienced.

In addition, there are a number of other additive manufacturing methods that can be employed to produce solid and/or hybrid rocket fuel grains according to the present invention and using a formulation of slurry material such as a polymer and/or nanocomposite additive, without departing from the spirit and scope of the present invention, including but not limited to: Stereolithography, Selective Laser Sintering, Powder Bed Printing, and Inkjet Head Printing. For the example, a composition of the fuel grain may comprise about 95% by mass Acrylonitrile Butadiene Styrene (ABS), a thermoplastic possessing combustion characteristics desirable for hybrid rocket engine fuel, and about 5% nanocomposite aluminum. Fuel having this structure is available from several sources, as known by those skilled in the art. With a Young's Modulus of 2.0-2.6 GPa, ABS is 460 times less elastic than HTPB and 38 times less elastic than paraffin wax, making it an ideal material for fabricating a hybrid rocket fuel grain and the center chamber 102 of the combustion chamber.

In some embodiments of the present invention, a particular method of making a fuel grain for use in a rocket engine is contemplated. In the preferred embodiment, said method permits continuous monitoring, continuous mixing, and continuous modification of the slurry layers by way of multiple nozzles. In some embodiments, the method of making a fuel grain includes compounding a first material suitable as a hybrid rocket propellant, a second energetic material, and a third ignitable material according to a predetermined mixture ratio in order to form a fourth material. Notably, in some embodiments this fourth material may serve as a raw material for use in an additive manufacturing device. In other embodiments, this proprietary method involves operating the additive manufacturing device using the above-mentioned raw material to fabricate a solidified fuel grain comprising a plurality of stacked layers. As described above, the stacked layers may be joined securely and combined into a plurality of stacked layers, the plurality of stacked layers forming a cylindrical fuel grain. Further, the plurality of layers may be aligned to form a combustion unit extending axially through the fuel grain and bounded by a combustion surface. In other words, the plurality of layers may form a central chamber as described above. Notably, the above-described fuel grain may be configured to permit mixing of heterogenous propellants in order to enhance thrust performance.

Generally, energetic materials suitable for use in the present invention are a class of material with high concentrations of stored chemical energy that may be released. Highly energetic materials include, for example, ultrafine aluminum powder, the particle size of which may vary from micron to nanoscale, including particles that are a composite of aluminum and polymer in nanoscale. As known by those skilled in the art, generally a nanocomposite is a material comprising two or more constituent solids, the size of which measures 100 nanometers (nm) or less. Even though the nano-scale aluminum particle cores are completely encapsulated in a polymer based oligomer coating and thus passivated, there remains the possibility that this highly energetic pyrophoric material can still be reactive with oxygen or water vapor, or slowly degrade over time based on diffusion physics during storage In one application, the compounded material is stored within a climate controlled environment. As a further safety measure, in some embodiments after fabrication each fuel grain or fuel grain section may be shrink-wrapped to encase the fuel grain or fuel grain section in a thin plastic film to prevent atmospheric exposure prior to its use in a rocket engine. In another embodiment the fuel grain is spray coated with a polymeric material or paint that serves to prevent atmospheric exposure. According to another embodiment the fuel grain or grain segment is inserted into an air-tight packaging cylinder and a vacuum drawn to remove all air. The packaging cylinder is sealed before it is removed from the print bed chamber.

Exemplary constructions of the solid and/or hybrid rocket fuel grains are engineered to both increase the amount of surface area available for combustion as a means to improve regression rate, to improve specific impulse, to generate an oxidizer vortex flow, and to reduce fuel waste by inducing oxidizer axial flow within the center chamber 102 to allow more time for oxidizer and fuel gases (or oxidizer and entrained liquid droplets) to mix and combust more thoroughly. Any surface area pattern or topology that furthers one or more of these objectives, and is sustainable throughout the fuel grain cross-section (i.e., as one fuel grain layer ablates the next fuel gran layer presents a desirable surface area pattern) is considered within the scope of the present invention.

As described above, as shown in FIG. 1A and FIG. 2A, the fuel grain section has a generally cylindrical shape and defines a center chamber 102. As depicted in FIG. 2A, the solid fuel grain 100 section is formed via continuous modification forming a stack of layers with each such layer formed as a series of abutting and/or interwoven surfaces of solidified material arrayed around the center chamber 102. In one embodiment, a heat gun is used to bond the individual layers. As is known by those skilled in the art, other adhesives may be used to join the grain section.

In some embodiments, the present invention may include an electrically-operated propellant or energetic gas-generating material, additively manufactured together with electrodes for producing a reaction in the material. As depicted in FIG. 2A and FIG. 2B, the device may also include a shell 106 that is additively manufactured with the other components. The additive manufacturing process may be accomplished by extruding or otherwise depositing raw materials for the different components where desired. The electrodes may be made of a conductive polymer material, for example using an electrically-conductive fill in a polymer. Regarding electrically operated propellants, in the preferred embodiment an electrically operated propellant ignites with the application of electricity (from the electrodes) and correspondingly extinguishes with the cessation of electricity, even when exposed to high pressures, though below a high pressure threshold. For example, when exposed to ambient or high pressures within the shell, such as atmospheric pressure, pressures greater than 200 psi, 500 psi, 1000 psi, 1500 psi and up to 2000 psi, the electrically operated propellant is extinguished with the interruption of electricity (e.g., voltage or current) applied across the electrically operated propellant. In other words, without application of electricity, the combustion of the electrically operated propellant is not self-sustaining at high pressures, such as high pressures of 200 psi or more and less than 2000 psi. Thus, the electrically operated propellant is configured for "on" and "off" operation under the described variety of conditions.

Notably, the electrodes may also be made of any of a variety of electrically conductive materials. One suitable material may be a conductive polymer material. This may be a polymer material that includes a conductive material fill, such as electrically-conductive powder or electrically-conductive fibers. The fill material may include carbon and/or graphene powders or fibers. Other possible fill materials may be metal powders or other electrically conductive materials, preferably with a melting point that is greater than an extrusion temperature.

The conductive material may also be an extrudable or solid metal, for example copper wire surrounded by a plastic sheath. The material is passed through heated nozzles 103 (or other dispensers), which melts the plastic sheath, while leaving the metal in solid form. Cut bits of metal may come into electrical conduct with one another, to allow the electrodes to be produced using this process.

Various numbers and placement of electrodes are possible. For example, the electrode arrangement may include electrodes in concentric circles, parallel plates, or a grid-like array of plates. Whatever the arrangement of the electrodes, there may be electrical leads between the electrodes and a power source, such as a battery, that is used for providing power to active the propellant material. The electrical power source may be coupled to a suitable control system for providing electrical power to the electrodes when burning of the propellant or energetic material is desired.

Further to the above, in some embodiments additive manufacturing is utilized to embed electrical conductors in the propellant so as to reduce ESD hazards. In other embodiments, embedded electrochemical sensors are used to indicate relative stabilizer depletion and/or related health monitoring metrics. Further, in some embodiments embedded pressure sensors are utilized to measure internal off-gassing, internal swelling, pressure buildup, and the like. Monitoring these elements enhances one's ability to monitor age-out indicators and other important indicators of device health. In still other embodiments, additive manufacturing is utilized to embed actuators, such as piezoelectric devices, in various locations around the device. Notably, as described above, one may also modify fuel grain configurations during a mission in order to modulate thrust characteristics during flight. In some embodiments, embedded actuators may be crucial to monitoring the health of these systems.

Relatedly, in some embodiments different controllers and/or control algorithms may be used to control the different nozzles 103, in order to achieve the desired deposition volume and form in various configurations. For instance, software and/or firmware for controlling the movement of the nozzles 103, and for controlling the supply of various raw materials to the nozzles 103, may be configured with software and/or firmware that takes into account the differences in operation of different of the nozzles 103.

In some embodiments, software and/or firmware may include a plugin framework that may support integrating third party algorithms and software for sensor simulation, vehicle models, etc. In some embodiments, the plugins may communicate with each other through a subscription paradigm carried out, for instance, using the Data Distribution Services (DDS) standard. This may enable third party engineers to quickly contribute new functionality through the plugin model including, e.g., rocket control algorithms.

Further, in some embodiments additive manufacturing is utilized to control software and sensor networks which consequently permit operators to vary the characteristics of the end-use product. Multiple variables may be controlled by the user including: inert materials placement, cure rate, design configuration, ballistics, explosive yield, and other structural properties. As described above, monitoring and control of these variables allows for varied thrust profiles. Catalysts may also be utilized to induce a quick cure. Finally, this process is facilitated by the mixing of elements described above in addition to use of the correct viscosity.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

Although the invention has been shown and described with respect to a certain preferred embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any particular application.

What is claimed is:

1. A fuel grain for a rocket, the fuel grain comprising:
a cylindrical shell housing a plurality of layers of fuel grain material, each layer comprising a plurality of concentric circular structures of different diameter fused together to form a central opening therein;
wherein the fuel grain material comprises an electrically ignitable substance; the plurality of layers stacked and joined securely to form a cylindrical fuel grain with the central opening of each one of the plurality of layers aligned to form a combustion unit extending axially through the fuel grain and bounded by a combustion surface;
a series of annular sections housed within the cylindrical shall, the annular sections having spaces between them filled with the electrically ignitable substance; wherein the annular sections comprise embedded electrodes and embedded sensors; wherein the embedded sensors indicate relative stabilizer depletion, internal off-gassing, internal swelling, and pressure buildup;
a central chamber formed at least in part by the plurality of layers, each layer having a series of abutting and interwoven surfaces of solidified fuel grain material arrayed around the central chamber to increase the surface area of the combustion surface;
wherein the fuel grain includes heterogenous materials having unfilled thermoplastics and filled thermoplastics to enhance thrust performance;
wherein the heterogenous materials further comprise propellants; wherein the propellants comprise electrically activated solid propellant; wherein the propellant is additively manufactured in conjunction with the sensors;
wherein the electrically activated solid propellant is ignited by the embedded electrodes;
wherein increase in surface area of the combustion surface improves regression rate, specific impulse, generates an oxidizer vortex flow, and reduces fuel waste by inducing oxidizer axial flow within the center chamber to allow more time for oxidizer and fuel gases to mix and combust thoroughly.

2. The fuel grain of claim 1 wherein the fuel grain material is processed with about 95% by mass Acrylonitrile Butadiene Styrene (ABS) and about 5% nanocomposite aluminum.

3. The fuel grain of claim 2 wherein the fuel grain comprises a hybrid fuel grain.

4. The fuel grain of claim 2 wherein the fuel grain is a solid fuel grain.

5. The fuel grain of claim 1 wherein the heterogenous materials further comprise heterogenous composite propellants, wherein the heterogenous composite propellants comprise an oxidizer and a binder, the oxidizer comprising a solid-based perchlorate oxidizer that includes ammonium perchlorate, aluminum perchlorate, barium perchlorate, calcium perchlorate, lithium perchlorate, magnesium perchlorate, perchlorate acid, strontium perchlorate, and/or sodium perchlorate.

6. The fuel grain of claim 5 wherein the fuel grain is produced by an additive manufacturing process.

7. The fuel grain of claim 6 wherein the fuel grain has tailorable chemistries adaptable to continuous monitoring and/or continuous modification during the additive manufacturing process.

8. The fuel grain of claim 1 further comprising a thermally insulating material surrounding the fuel grain.

9. The fuel grain of claim 1 wherein a shape of the combustion unit comprises a circular shape, an oval shape, an elliptical shape, a cylindrical shape, or a polygonal shape.

10. A rocket engine comprising:
an oxidizer source, the oxidizer for flowing through a combustion port during engine operation;
a cylindrical shell for housing at least a fuel grain and the oxidizer source;
the fuel grain comprising:
a plurality of layers of fuel grain material, each layer comprising a plurality of concentric circular structures of different diameter fused together to form a central opening therein;
wherein the fuel grain material comprises an electrically ignitable substance; the plurality of layers stacked and joined securely to form a cylindrical fuel grain with the central opening of each one of the plurality of layers aligned to form a combustion unit extending axially through the fuel grain and bounded by a combustion surface;
a series of annular sections housed within the cylindrical shell; wherein the annular sections comprise embedded electrodes and embedded sensors; wherein the embedded sensors indicate relative stabilizer depletion, internal off-gassing, internal swelling, and pressure buildup;
a central chamber formed at least in part by the plurality of layers;
wherein the fuel grain includes heterogenous materials having unfilled thermoplastics and filled thermoplastics to enhance thrust performance; wherein the heterogenous materials further comprise propellants; wherein the propellants comprise electrically activated solid propellant; and
wherein each layer having a series of abutting and interwoven surfaces of solidified fuel grain material which increases the surface area of the combustion surface and improves regression rate, specific impulse, generates an oxidizer vortex flow, and reduces fuel waste by inducing oxidizer axial flow within the center chamber to allow more time for oxidizer and fuel gases to mix and combust thoroughly.

11. The rocket engine of claim 10 wherein the rocket engine further comprises a pre-ignition section with a post-ignition section at the end of a rocket body opposing a payload section.

12. The rocket engine of claim 10 wherein the fuel grain is a hybrid fuel grain.

13. The rocket engine of claim 10 wherein the fuel grain material is processed with about 95% by mass Acrylonitrile Butadiene Styrene (ABS) and about 5% nanocomposite aluminum.

14. The rocket engine of claim 13 wherein the fuel grain has tailorable chemistries adaptable to continuous monitoring and/or continuous modification during the additive manufacturing process.

* * * * *